Patented Aug. 23, 1932

1,873,668

UNITED STATES PATENT OFFICE

HANS SCHMIDT, OF WUPPERTAL-VOHWINKEL, GERMANY, ASSIGNOR TO WINTHROP CHEMICAL COMPANY, INC., OF NEW YORK, N. Y., A CORPORATION OF NEW YORK

STABLE SOLUTIONS OF METAL COMPLEX COMPOUNDS

No Drawing. Application filed April 13, 1931, Serial No. 529,889, and in Germany May 10, 1929.

The present invention relates to stable aqueous solutions of neutral metal complex compounds of polyoxy benzenes which contain at least two hydroxy groups in ortho-position to each other and at least one carboxylic or sulfonic acid group.

It is known that stable injection solutions can be obtained from metal complex salts of polyhydroxy benzenes containing at least two hydroxy groups in the ortho-position and containing acid-salt-forming groups, but the standardization of these solutions to a neutral reaction is confined to certain limits, because as soon as the solution becomes weakly alkaline discoloration of the solution mostly takes place. This discoloration can, for example, already occur when injection solutions are standardized to a pH range of about 6.5 to 7.5, which range is suitable for injection purposes. The same discoloration is mostly observed during the sterilization of the said solutions.

In accordance with the present invention, aqueous solutions of the alkali salts of complex compounds of a heavy, therapeutically active metal of the group consisting of antimony, arsenic, manganese and bismuth with a polyhydroxy benzene of the probable formula

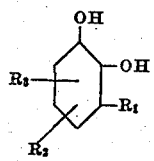

wherein $R_1$ stands for hydrogen or a hydroxy group, $R_2$ stands for a carboxylic or sulfonic acid group and $R_3$ stands for hydrogen or a sulfonic acid group, may be rendered stable, when stored in closed vessels, also when standardizing these solutions to a pH range of about 6.5 to 7.5 by adding to these solutions derivatives of sulfurous acid. The alkali metal- and ammonium-sulfites, -bisulfites, -metabisulfites and -acetone bisulfites have proved to be especially suitable for the above purpose. A content of about 2 parts per 1000 of these substances is sufficient to prohibit the discoloration of the complex salt solutions of a pH range of about 6.5 to 7.5 even when the solutions are sterilized by heat, so that by these very small admixtures a remarkable improvement of the stability of the aqueous solutions of the said metal complex compounds is effected without these solutions having any disadvantage for injection purposes. It may be mentioned that solutions containing only 1 part per 1000 or a still smaller quantity of the stabilizer have proved sufficiently stable, although a higher content of the stabilizer, for example, 5 parts per 1000 is without disadvantage in the preparation of the injection solutions.

The invention is further illustrated by the following examples without being restricted thereto:

Example 1

A 6.3% aqueous solution of antimonyl-pyrocatechol-sodium disulfonate of the probable formula:

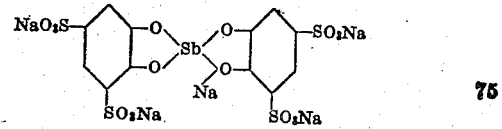

is incorporated in the proportion of 1:1000 with sodium meta-bisulfite and then the solution is standardized to a hydrogen ion concentration (pH) of 6.8 to 7.5 by the addition of dilute caustic soda lye or ammonia. The solution obtained is then filled into ampoules. When being sterilized by heat, the solution remains colorless in the ampoules and is stable when stored.

When using instead of antimonyl-pyrocatechol-sodium disulfonate, antimonyl-pyrocatechol-sodium monosulfonate or antimonyl-pyrogallol-sodium disulfonate, likewise stable, colorless aqueous solutions of the latter of a pH of 6.8 to 7.5, containing 1% of sodium metabisulfite, are obtained which are especially suitable for injection purposes.

The same results are obtained by using instead of sodium metabisulfate the corresponding quantities of potassium or ammonium meta-bisulfite or of sodium, potassium or ammonium-bisulfites or sulfites or mixtures of these substances.

Example 2

6.15 grams of manganese pyrocatechol sodium disulfonate and 1 gram of sodium metabisulfite are dissolved in one liter of water. This solution is standardized to a hydrogen ion concentration of about 7 by means of dilute caustic soda lye, filled into ampoules and sterilized. After sterilizing a scarcely colored solution is obtained.

Example 3

5 grams of the sodium salt of antimonyl-protocatechuic acid of the probable formula:

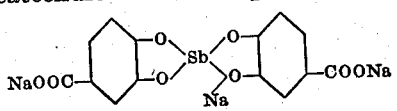

and 0.2 grams of sodium bisulfite are dissolved in water, the solution is standardized to a pH of about 7.2, made up to 100 ccs., filled into ampoules and sterilized by heat. A light colored solution is obtained.

In an analogous manner, the potassium salt of antimonyl-pyrocatechol-ortho-carboxylic acid can be added to a stable aqueous solution of a pH of about 7.

Example 4

10 grams of bismuth-pyrocatechol-sodium disulfinate and 0.1 gram of sodium bisulfite are dissolved in water. The solution is then standardized to a pH of about 7 by means of dilute caustic potash solution, filled up to 100 ccs., put into ampoules and sterilized by heat. A light colored solution is obtained.

When using instead of the above bismuth complex salts the corresponding arsenous compounds, an analogous result is obtained.

Complex salts of the different metals mentioned above, mixed with an alkali salt of any other complex forming components of the formula:

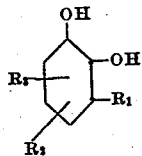

wherein $R_1$ stands for hydrogen or a hydroxy group, $R_2$ stands for a sulfonic or carboxylic acid group and $R_3$ stands for hydrogen or a sulfonic acid group, the production of the stable solutions of such complex compounds not having been specifically described above, yield in the same manner the stable solutions without showing any remarkable difference when compared with the above examples.

I claim:

1. Aqueous solutions of the alkali metal salts of complex compounds of a therapeutically active heavy metal of the group consisting of antimony, arsenic, manganese and bismuth with a polyhydroxy benzene of the probable formula:

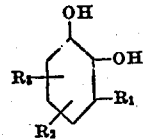

wherein $R_1$ stands for hydrogen or a hydroxy group, $R_2$ stands for an acid substituent of the group consisting of the carboxylic and sulfonic acid groups and $R_3$ stands for hydrogen or a sulfonic acid group, said solutions being characterized by a hydrogen ion concentration of about 6.5 to 7.5 and by a small content of a sulfurous acid derivative of the group consisting of alkali metal- and ammonium-sulfites, -bisulfites, -meta bisulfites and acetonebisulfites, said solutions being stable when filled in closed vessels and showing no discoloration even when sterilized by heat.

2. Aqueous solutions of the alkali metal salts of complex compounds of a therapeutically active heavy metal of the group consisting of antimony, arsenic, manganese and bismuth with a polyhydroxy benzene of the probable formula:

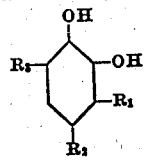

wherein $R_1$ stands for hydrogen or a hydroxy group, $R_2$ stands for an acid substituent of the group consisting of the carboxylic and sulfonic acid group and $R_3$ stands for hydrogen or a sulfonic acid group, said solutions being characterized by a hydrogen ion concentration of about 6.5 to 7.5 and by a small content of a sulfurous acid derivative of the group consisting of alkali metal- and ammonium-sulfites, -bisulfites, -metabisulfites and acetonebisulfites, said solutions being stable when filled in closed vessels and showing no discoloration even when sterilized by heat.

3. Aqueous solutions of the alkali metal salts of complex compounds of a therapeutically active heavy metal of the group consisting of antimony, arsenic, manganese and bismuth with a polyhydroxy benzene of the probable formula:

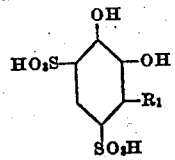

wherein $R_1$ stands for hydrogen or a hydroxy group, said solutions being characterized by a hydrogen ion concentration of about 6.5 to 7.5 and by a small content of a sulfurous acid derivative of the group consisting of alkali metal- and ammonium-sulfites, -bisulfites -metabisulfites and acetonebisulfites, said solutions being stable when filled in closed vessels and showing no discoloration even when sterilized by heat.

4. Aqueous solutions of the alkali metal salts of complex compounds of antimony with a polyhydroxy benzene of the probable formula:

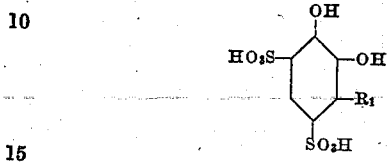

wherein $R_1$ stands for hydrogen or a hydroxy group, said solutions being characterized by a hydrogen ion concentration of about 6.5 to 7.5 and by a small content of a sulfurous acid derivative of the group consisting of alkali metal- ammonium-sulfites, -bisulfites, -metal bisulfites and acetonebisulfites, said solutions being stable when filled in closed vessels and showing no discoloration even when sterilized by heat.

5. Aqueous solutions of the alkali metal salts of complex compounds of a therapeutically active heavy metal of the group consisting of antimony, arsenic, manganese and bismuth with a polyhydroxy benzene of the probable formula:

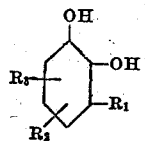

wherein $R_1$ stands for hydrogen or a hydroxy group, $R_2$ stands for an acid substituent of the group consisting of the carboxylic and sulfonic acid groups and $R_3$ stands for hydrogen or a sulfonic acid group, said solutions being characterized by a hydrogen ion concentration of about 6.5 to 7.5 and by the content of 1-5 parts per 1000 of a sulfurous acid derivative of the group consisting of alkali metal- ammonium-sulfites, -bisulfites, -meta bisulfites and acetonebisulfites, said solutions being stable when filled in closed vessels and showing no discoloration even when sterilized by heat.

6. Aqueous solutions of the alkali metal salts of complex compounds of a therapeutically active heavy metal of the group consisting of antimony, arsenic, manganese and bismuth with a polyhydroxy benzene of the probable formula:

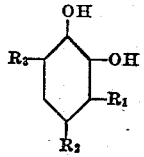

wherein $R_1$ stands for hydrogen or a hydroxy group, $R_2$ stands for an acid substituent of the group consisting of the carboxylic and sulfonic acid groups and $R_3$ stands for hydrogen or a sulfonic acid group, said solutions being characterized by a hydrogen ion concentration of about 6.5 to 7.5 and by the content of 1-5 parts per 1000 of a sulfuric acid derivative of the group consisting of alkali metal- and ammonium-sulfites, -bisulfites, metabisulfites and acetonebisulfites, said solutions being stable when filled in closed vessels and showing no discoloration even when sterilized by heat.

7. Aqueous solutions of the alkali metal salts of complex compounds of a therapeutically active heavy metal of the group consisting of antimony, arsenic, manganese and bismuth with a polyhydroxy benzene of the probable formula:

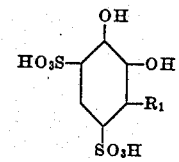

wherein $R_1$ stands for hydrogen or a hydroxy group, said solutions being characterized by a hydrogen ion concentration of about 6.5 to 7.5 and by the content of 1-5 parts per 1000 of a sulfurous acid derivative of the group consisting of alkali metal- and ammonium-sulfites, -bisulfites, -metabisulfites and acetonebisulfites, said solutions being stable when filled in closed vessels and showing no discoloration even when sterilized by heat.

8. Aqueous solutions of the alkali metal salts of complex compounds of antimony with a polyhydroxy benzene of the probable formula:

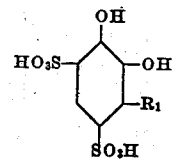

wherein $R_1$ stands for hydrogen or a hydroxy group, said solutions being characterized by a hydrogen ion concentration of about 6.5 to 7.5 and by the content of 1-5 parts per 1000 of a sulfurous acid derivative of the group consisting of alkali metal- ammonium-sulfites, -bisulfites, -metabisulfites and acetonebisulfites, said solutions being stable when filled in closed vessels and showing no discoloration even when sterilized by heat.

9. Aqueous solutions of the antimony complex compound of the probable formula:

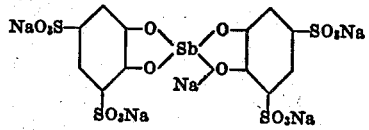

said solutions being characterized by a hydrogen ion concentration of about 6.8 to 7.5 and by a content of about 1 part per 1000 of sodium metabisulfite, said solutions being stable when filled into closed vessels and showing no discoloration even when sterilized by heat.

10. Aqueous solutions of the antimony complex compound of the probable formula:

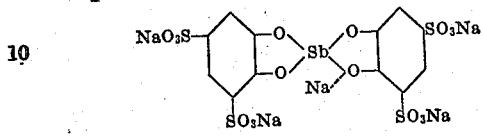

containing about 6.3% of the said complex compounds, said solutions being characterized by a hydrogen ion concentration of about 6.8 to 7.5 and by a content of about 1 part per 1000 of sodium metal-bislulfite, said solutions being stable when filled into closed vessels and showing no discoloration even when sterilized by heat.

11. Aqueous solutions of the antimony complex compound of the probable formula:

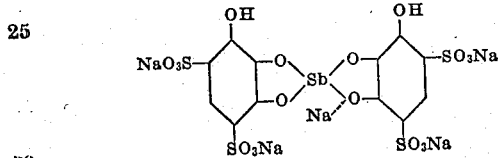

said solutions being characterized by a hydrogen ion concentration of about 6.8 to 7.5 and by a content of about 1 part per 1000 of sodium metabisulfite, said solutions being stable when filled into closed vessels, showing no discoloration even when sterilized by heat.

In testimony whereof, I affix my signature.

HANS SCHMIDT.